(12) United States Patent
Abraham et al.

(10) Patent No.: US 8,196,461 B2
(45) Date of Patent: Jun. 12, 2012

(54) METHOD AND DEVICE FOR CHECKING THE REFERENCING OF MEASURING HEADS IN A CHASSIS MEASURING SYSTEM

(75) Inventors: Steffen Abraham, Hildesheim (DE); Daniel Muhle, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 12/735,363

(22) PCT Filed: Dec. 30, 2008

(86) PCT No.: PCT/EP2008/068343
§ 371 (c)(1),
(2), (4) Date: Sep. 29, 2010

(87) PCT Pub. No.: WO2009/095140
PCT Pub. Date: Aug. 6, 2009

(65) Prior Publication Data
US 2011/0056281 A1    Mar. 10, 2011

(30) Foreign Application Priority Data
Jan. 28, 2008 (DE) .......................... 10 2008 006 329

(51) Int. Cl.
*G01M 17/04* (2006.01)
(52) U.S. Cl. .................................................. 73/117.01
(58) Field of Classification Search ............... 73/117.01, 73/117.02, 117.03
See application file for complete search history.

(56) References Cited

U.S. PATENT DOCUMENTS

| | | | |
|---|---|---|---|
| 4,745,469 A | | 5/1988 | Waldecker et al. |
| 5,535,522 A | * | 7/1996 | Jackson ........................... 33/288 |
| 5,724,743 A | * | 3/1998 | Jackson ........................... 33/288 |
| 5,870,315 A | | 2/1999 | January |
| 5,943,783 A | * | 8/1999 | Jackson ........................... 33/288 |
| 6,148,528 A | * | 11/2000 | Jackson ........................... 33/288 |
| 6,397,164 B1 | * | 5/2002 | Nobis et al. .................... 702/150 |
| 6,710,866 B1 | * | 3/2004 | Adolph ..................... 356/139.09 |

(Continued)

FOREIGN PATENT DOCUMENTS

| | | |
|---|---|---|
| DE | 36 18 480 | 12/1986 |
| DE | 39 04 557 | 8/1990 |
| DE | 197 57 760 | 7/1999 |
| DE | 197 57 763 | 7/1999 |
| DE | 199 34 864 | 2/2001 |
| DE | 100 50 653 | 5/2002 |
| EP | 1 184 640 | 3/2002 |
| WO | WO 02/31437 | 4/2002 |

OTHER PUBLICATIONS

Homer H. Chen: A Screw Motion Approach to Uniqueness Analysis of Head-Eye Geometry. Computer Vision and Pattern Recognition, 1991. Proceedings CV.Ple91., IEEE Computer Society Conference, pp. 145-151, 1991).

*Primary Examiner* — Freddie Kirkland, III
(74) *Attorney, Agent, or Firm* — Kenyon & Kenyon LLP

(57) ABSTRACT

A method for checking the referencing of at least two measuring heads of a contactless chassis measuring system includes: detecting at least one geometry detail of a vehicle using the measuring heads; determining an initial position of the geometry detail in the coordinate system associated with each measuring head; transforming the initial position into a shared coordinate system; executing a relative movement between the measuring heads and the vehicle; determining a final position of the at least one geometry detail in the coordinate system associated with each measuring head; transforming the final position of the geometry detail into the shared coordinate system; determining the movement vectors from the difference between the final position and the initial position of the at least one geometry detail; checking the movement vectors for coincidence.

20 Claims, 1 Drawing Sheet

U.S. PATENT DOCUMENTS

| | | | |
|---|---|---|---|
| 6,968,282 B1 | 11/2005 | Jackson et al. | |
| 7,860,295 B2 * | 12/2010 | Donner et al. | 382/141 |
| 2006/0279728 A1 | 12/2006 | Dorrance et al. | |
| 2011/0058581 A1 * | 3/2011 | Nobis et al. | 372/38.07 |
| 2011/0085181 A1 * | 4/2011 | Muhle et al. | 356/615 |
| 2011/0100107 A1 * | 5/2011 | Nobis et al. | 73/117.03 |
| 2011/0187851 A1 * | 8/2011 | Nobis et al. | 348/135 |
| 2011/0193955 A1 * | 8/2011 | Abraham et al. | 348/135 |
| 2011/0308309 A1 * | 12/2011 | Nobis et al. | 73/115.07 |
| 2012/0007957 A1 * | 1/2012 | Abraham et al. | 348/47 |
| 2012/0007958 A1 * | 1/2012 | Nobis et al. | 348/48 |
| 2012/0026293 A1 * | 2/2012 | Gruetzmann et al. | 348/46 |

* cited by examiner

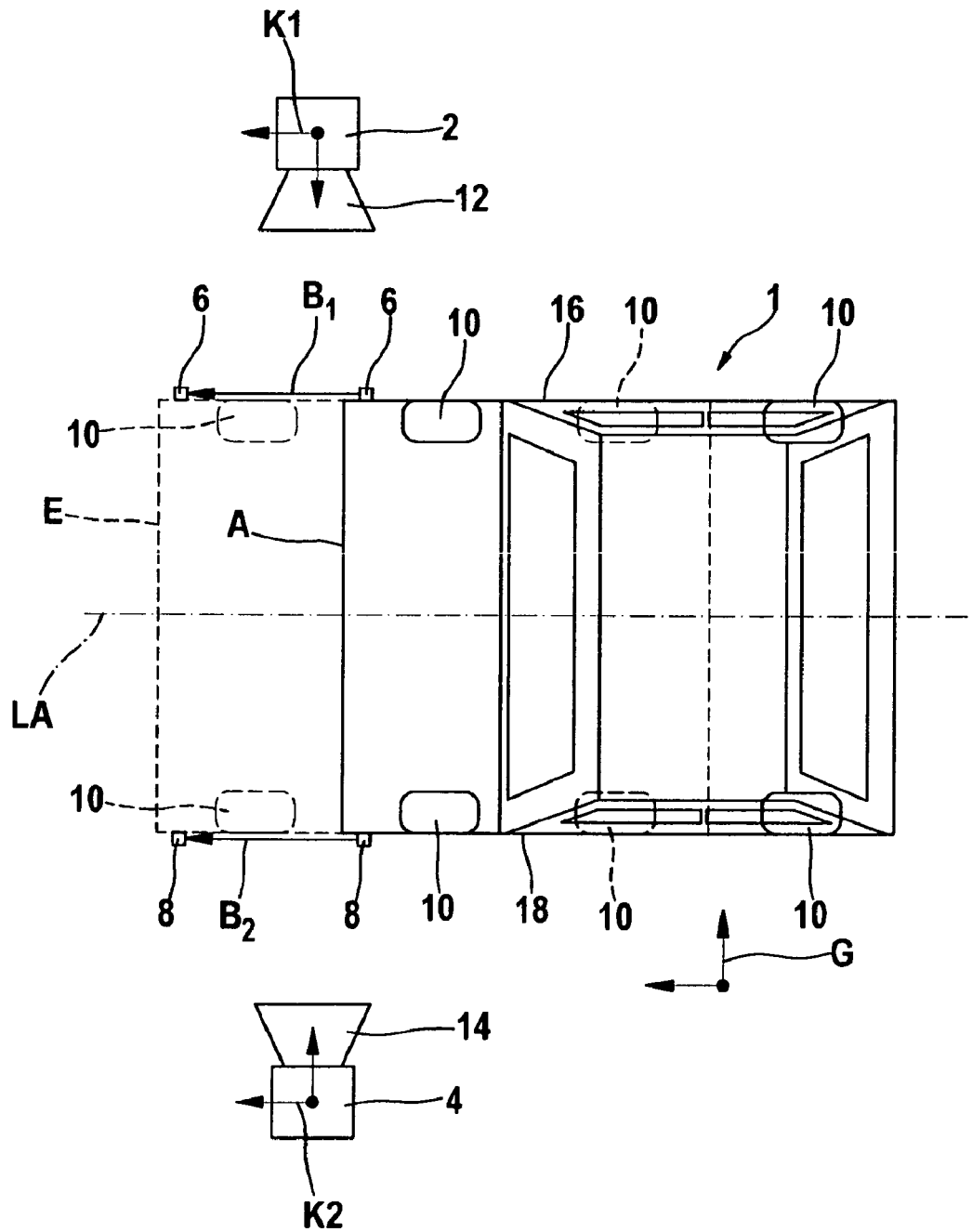

METHOD AND DEVICE FOR CHECKING THE REFERENCING OF MEASURING HEADS IN A CHASSIS MEASURING SYSTEM

BACKGROUND OF THE INVENTION

1. Field of the Invention

The present invention relates to chassis measuring, and in particular a method and a device for checking the referencing of measuring heads of a contactless chassis measuring system.

2. Description of Related Art

In optical chassis measuring, for example, the measuring of toe and camber on motor vehicles, measuring heads are used, which each detect one wheel or possibly the wheels of one vehicle side. The position of wheel axes, rotational axes, wheel centers, or rotational centers are calculated from the measured values and used for determining the toe and camber.

A fundamental requirement in a system for, chassis and axle measuring is that the measured values of all measuring heads are provided in a shared coordinate system ("reference system") or are transformed into such a shared coordinate system. The characteristic variables of the geometrical position of the measuring heads among one another, such as their position and orientation, which are required for a representation of the measured values in a shared coordinate system, are referred to hereafter as referencing of the measuring heads.

Various methods exist for generating a shared coordinate system in connection with the axle measuring:

In mechanical approaches (see, for example, published German patent document DE-3904557), mechanical adapters which determine the toe and the camber of an individual wheel are fastened directly onto the wheel. To produce a shared reference system, for example, additional optical sensors are integrated into the adapters, which are capable of determining the orientation with respect to adapters which are fastened on adjacent wheels.

Contactless approaches are characterized in that no adapters having measuring function are fastened onto the wheel. The measuring of the desired angular variables is typically executed by a measuring head, which has a video camera. The contactless approaches exist in various variants:

In a first variant, the referencing is only determined upon the construction of the system and is viewed as constant for all following measurements (see, for example, U.S. Pat. Nos. 4,745,469, 5,870,315).

In a second variant, each wheel is observed via a separate measuring head having a single or stereo video sensor. The values of the axle measuring are initially only provided in the local measuring system of the individual measuring head. For transforming the measuring values into a shared reference system, points are measured on a control point body before and during the measurement, each camera always only having to see one part of the control point body. A transformation into the shared control point system may be determined for each measuring head from the measurement of the control points in the local reference system of the individual measuring system and the known coordinates of the control points in the shared control point system. This referencing is typically performed before each measurement (see, for example, published German patent documents DE 3618480, DE 19757763, and DE 10050653, as well as US Patent Application Publication 2006 0279728).

In a third variant, an individual measuring head is expanded by an additional camera or a calibration element, which is in a calibrated relationship to the local coordinate system of the measuring head, to produce a shared reference system. The orientation between measuring head and additional camera is typically determined only once and is viewed as constant for all following measurements (see, for example, published European patent document EP 1184640, U.S. Pat. No. 6,968,282, and published European patent document EP 1309832).

The methods known up to now for referencing are imprecise and/or complex. It is therefore an object of the present invention to provide a method and a device for checking precisely and in a rapidly executable manner the referencing of measuring heads of a chassis measuring system, without increasing the hardware outlay.

BRIEF SUMMARY OF THE INVENTION

The present invention includes a method for checking the referencing of at least two measuring heads of a contactless chassis measuring system having the following steps: detecting at least one geometry detail of a vehicle using the at least two measuring heads; determining an initial position of the geometry detail in the coordinate system associated with each measuring head; transforming the initial position of the geometry detail into a shared coordinate system; executing a relative movement between the measuring heads, on the one hand, and the vehicle, on the other hand, the relative position of the measuring heads to one another being kept constant; detecting again at least one geometry detail of a vehicle using the at least two measuring heads; determining a final position of the at least one geometry detail in the coordinate system associated with each measuring head; transforming the final position of the geometry detail into the shared coordinate system; determining the movement vector from the difference between the final position and the initial position of the at least one geometry detail for each of the measuring heads in the shared coordinate system; checking the movement vector for the first measuring head for coincidence with the movement vector for the additional measuring head or the additional measuring heads.

The present invention also includes a method for checking the referencing of at least two measuring heads of a contactless chassis measuring system having the following steps: detecting at least one geometry detail of the vehicle using the measuring head; determining an initial position of the geometry detail in the coordinate system associated with each measuring head; executing a relative movement between the measuring heads, on the one hand, and the vehicle, on the other hand, the relative position of the measuring heads to one another being kept constant; detecting again the at least one geometry detail of the vehicle using the measuring heads; determining a final position of the geometry detail in the coordinate system associated with each measuring head; determining the movements from the difference between the final position and the initial position of the geometry detail in the coordinate system associated with each measuring head; transforming the movements into a shared coordinate system; checking the movement vector for the first measuring head for coincidence with the movement vector for the additional measuring head or the additional measuring heads in the shared coordinate system.

Through the method according to the present invention, the referencing of the chassis measuring system may be checked rapidly and precisely on the basis of a relative movement between the measuring heads and the vehicle in the measuring field of the measuring heads, for example, by moving the vehicle past the measuring heads. The precision of the chassis measuring following the referencing is thus improved, without a noticeably longer time being required for performing the measuring. No additional hardware is necessary in order to perform the referencing according to the present invention, so that the present invention may be implemented cost-effectively. The assumption that orientations which are measured once during the measurement or during the service life of the measuring system remain constant may be monitored. If a change in the position parameters is noted, a message may be given to the user, and the changed orientation may be corrected.

Currently known methods are based on the assumption that the geometrical position parameters which produce the reference to a shared coordinate system remain stable during an axle measuring procedure, that previously calibrated orientations remain constant during the operation of the measuring system, or that additional optical measuring systems and mechanical measuring systems are integrated into the measuring heads to monitor the referencing. Deviations from these assumptions directly result in a measuring error in the desired target variables. The methods according to the present invention check these assumptions and recognize and correct deviations, which increases the measuring precision and reliability of the measuring system.

The method according to the present invention is expediently integrated into the measuring data analysis during movement of the vehicle to recognize a change or to correct the referencing, and may be used in the axle measuring or in dynamic tests on the chassis, such as shock absorber testing, to increase the quality of the measurement results.

In a first implementation of the method according to the present invention, first the positions of the geometry detail are transformed into the shared coordinate system and the movement vectors are then determined in the shared coordinate system, while in a second implementation of the method the movement vectors are first determined in the coordinate system of the particular measuring head and then transformed into the global coordinate system.

According to the present invention, the term chassis measuring is to be understood to mean that it includes the technical areas of axle measuring, shock absorber testing, and chassis testing, including the testing of the joint play and the testing of the wheel suspension.

In one specific example embodiment, the relative movement between the measuring heads, on the one hand, and the vehicle, on the other hand, includes at least two translations, which are not parallel to one another. The checking of the referencing is thus improved, because all mutual rotations of the measuring heads are recognized.

In one specific example embodiment, the geometry detail detected by the first measuring head is situated on a first side of the vehicle, which faces the first measuring head, and the geometry detail detected by the second measuring head is situated on a side of the vehicle diametrically opposite to the first side, which faces the second measuring head. A geometry detail which is situated on a side of the vehicle facing the measuring head may be particularly reliably detected by the measuring head.

In an alternative specific example embodiment, the two measuring heads may also detect a shared geometry detail, which is visible from both sides.

The geometry detail may be a measuring target attached to the vehicle or an existing geometry detail of the vehicle, such as an edge of a rim or a fender. Measuring targets are implemented in such a way that they may be detected particularly reliably by the measuring heads. Through the use of existing geometry details, the work steps of attaching and removing the measuring target may be avoided. The performance of the measurement is thus further accelerated.

In one specific example embodiment, the vehicle is moved in relation to fixed measuring heads. Fixed measuring heads are particularly simple and cost-effective to manufacture, because they do not include moving parts. The movement of the vehicle typically does not constitute an additional effort, because the vehicle is driven into the measuring station in any case.

In another specific example embodiment, the measuring heads are moved in relation to the vehicle. This allows the method according to the present invention to be executed even if there is no room for moving the vehicle at the measuring station.

In one specific example embodiment, the method also includes the readjustment of the measuring heads. Possibly existing changes of the previously determined orientations may be corrected. The precision of the following chassis measuring is thus improved.

The two determined movement vectors may be made to coincide. For the readjustment, the deviation between one or more measurements of features in the camera image and a projection of a 3-D model of the features in the camera image may also be minimized, and optimized according to the transformation parameters $K_1$ and $K_2$.

In one specific example embodiment, the readjustment includes the adaptation of parameters for the conversion of the position from the local coordinate system into the shared coordinate system. The readjustment may thus be performed without moving the measuring heads, so that the readjustment may be performed particularly easily and rapidly. The measuring heads also no longer have to be designed as mechanically adjustable and may therefore be manufactured more cost-effectively.

Furthermore, the present invention includes a device for measuring the chassis geometry of a vehicle, which has a system of at least two measuring heads, which are set up to detect at least one geometry detail of the vehicle during operation and to determine its position in the coordinate system associated with each measuring head, and an analysis unit, which is set up to transform the position of the geometry detail in an initial position and the position of the geometry detail in its final position from the coordinate system of the particular measuring head into a shared coordinate system during operation, to determine a movement vector in the shared coordinate system from the difference of the position of the geometry detail in the initial position and the position of the geometry detail in the final position for each of the measuring heads and to check the movement vector for the first measuring head for coincidence with the movement vector for the additional measuring head or the additional measuring heads.

In addition, the present invention includes a device for measuring the chassis geometry of a vehicle, which has a configuration of at least two measuring heads, which are set up in operation to detect at least one geometry detail of the vehicle and determine its position in the coordinate system associated with each measuring head, and an analysis unit, which is set up in operation to determine a movement vector from the difference of the position of the geometry detail in an initial position and the position of the geometry detail in a final position for each measuring head, to transfer the movement vector for the first measuring head and the movement vector for the additional measuring head or the additional measuring heads into a shared coordinate system, and to check the movement vector for the first measuring head for correspondence with the movement vector for the additional measuring head or the additional measuring heads.

In one specific example embodiment, two measuring heads each have at least one camera. The at least one geometry detail may be detected particularly simply and reliably by a camera. In additional specific embodiments, at least one of the measuring heads includes two or more cameras, in order to increase the reliability of detection and improve the precision.

In one specific example embodiment, the device additionally has a movement device, which is implemented to execute a relative movement between the system of measuring heads, on the one hand, and the vehicle, on the other hand, between the initial position and the final position during operation, the relative position of the measuring heads to one another being kept constant. It is thus possible to execute a defined and controlled relative movement between the system of measuring heads and the vehicle. In particular, accidents due to an uncontrolled movement of the vehicle may be avoided.

In additional specific example embodiments, the device according to the present invention is implemented to execute, during operation, the method steps claimed in the dependent method claims and has the corresponding structural features.

BRIEF DESCRIPTION OF THE DRAWING

FIG. 1 schematically illustrates a device for performing the method according to the present invention.

DETAILED DESCRIPTION OF THE INVENTION

FIG. 1 shows a schematic top view of the outline of a vehicle 1, in an initial position A (solid line) at point in time $t_i$ and in a final position E (dashed line) at point in time $t_{i+1}$. For simplification, only two points in time are shown in the FIGURE. In addition to the outline of the chassis of vehicle 1, four wheels 10 are schematically shown. Vehicle 1 is situated in such a way that its front side is shown on the left in the FIGURE and its rear side on the right. Final position E is located horizontally on the left from initial position A. The movement between initial position A and final position E occurs parallel to horizontal longitudinal axis LA of vehicle 1. Vehicle 1 is not rotated during the movement shown here.

One measuring head 2, 4 is situated in each case on the left and right of vehicle 1 in the movement direction, which each have a camera 12, 14, which is directed toward vehicle 1. A measuring target 6, 8 is attached on each of side 16, 18 of vehicle 1 facing toward both measuring heads 2, 4, which is detected by camera 12, 14 of measuring head 2, 4 directed toward this side 16, 18. The relative orientation of measuring heads 2, 4 was previously determined by an established method (referencing) and is known.

Measuring heads 2, 4 measure the wheel axles and wheel centers of wheels 10 in local coordinate system $K_1$ or $K_2$, respectively, of the particular measuring head in one specific embodiment. The referencing now allows the transformation of the wheel axles and centers into global coordinate system G, e.g., the hydraulic lift, and thus the calculation of toe and camber, for example.

In the example shown in the FIGURE, measuring targets 6, 8 are attached in front of front wheels 10 of vehicle 1. However, this is only an exemplary position and measuring targets 6, 8 may be attached at any arbitrary point of vehicle 1, which is located in the field of vision of at least one camera 12, 14 of at least one measuring head 2, 4.

Vehicle 1 is initially located in initial position A, measuring targets 6, 8 are each detected by camera 12, 14 of at least one of measuring heads 2, 4, and the initial position of each measuring target 6, 8 is determined in coordinate system $K_1$, $K_2$ of particular measuring head 2, 4 and stored in measuring head 2, 4 or an analysis unit (not shown), which is connected via a data line or a wireless connection to measuring heads 2, 4.

Vehicle 1 is then moved manually or automatically guided from the initial position into final position E. In the example shown, vehicle 1 is moved from right to left in the forward direction of vehicle 1. Vehicle 1 may also be moved from left to right, i.e., "backward," however. In final position E, measuring targets 6, 8 are detected again by cameras 12, 14 of measuring heads 2, 4 and the final position of each measuring target 6, 8 is determined in coordinate system $K_1$, $K_2$ of particular measuring head 2, 4 and stored in measuring head 2, 4 or an analysis unit (not shown).

Movement vectors $B_1$, $B_2$ of geometry detail 6, 8 are calculated from the difference between the final position and the initial position of geometry detail 6, 8 in coordinate system $K_1$, $K_2$ associated with each measuring head 2, 4. This calculation may be performed in measuring heads 2, 4 or in the analysis unit. Movement vectors $B_1$, $B_2$ are transformed into a shared coordinate system G and compared to one another.

Alternatively, the initial position and the final position of particular measuring target 6, 8 may first be transformed into global coordinate system G and both movement vectors $B_1$, $B_2$ may be determined in global coordinate system G and compared to one another.

The details of the coordinate transformation between various coordinate systems are known to those skilled in the art (see, for example, HH Chen: A screw motion approach to a uniqueness analysis of head-eye geometry. Computer Vision and Pattern Recognition, 1991. *Proceedings CV.Ple91., IEEE Computer Society Conference*, pages 145-151, 1991) and are therefore not explained in greater detail here.

In the event of correct referencing, movement vectors B1, B2 are identical in shared coordinate system G, i.e., the difference between both movement vectors $B_1$, $B_2$ is less than a predetermined tolerance value. If the difference between both movement vectors $B_1$, $B_2$ in shared coordinate system G is greater than the predetermined tolerance value, the referencing is faulty and must be readjusted, in order to obtain precise results in the chassis measuring, i.e., a change in the relative orientation is visible directly as an error in the imaging of the movement to one another.

The readjustment may be performed by mechanical adjustment or correction of measuring heads 2, 4 and/or associated cameras 12, 14 or by adaptation of the parameters of the transformation from coordinate systems $K_1$, $K_2$ of measuring heads 2, 4 into global coordinate system G.

At least two different movements, which are not parallel to one another, must be observed for a unique determination of all parameters of the orientation of both coordinate systems $K_1$, $K_2$ in global coordinate system G. However, it is typically sufficient for the referencing of the chassis measuring to determine only some of the parameters, so that a linear movement (translation), such as a linear passage through the system of measuring heads 2, 4, is sufficient.

If such a simplified check of the referencing is not sufficient in the specific case and in particular if the rotation around the movement direction of the first translation and translations between measuring heads 2, 4 are also to be determined, additional suitable movements between vehicle 1 and measuring heads 2, 4 are additionally to be performed. Such movements may be executed, for example, using a hydraulic lift, which is mobile and in particular rotatable, and on which vehicle 1 is placed. Alternatively, the system of measuring heads 2, 4 may be pivoted relative to vehicle 1, the relative position of measuring heads 2, 4 being kept constant to one another during the pivoting.

In the exemplary method described above, the particular position of geometry detail 6, 8 is determined in an initial position A and a final position E, in order to ascertain the movement. However, additional positions which are between initial position A and final position E may also be determined in order to improve the precision of the method.

What is claimed is:

1. A method for checking the referencing of at least two measuring heads of a contactless vehicle-chassis measuring system, comprising:
    detecting two geometry details of a vehicle using the measuring heads;
    for each detected geometry detail, determining an initial position of the geometry detail in a local coordinate system associated with the respective measuring head;
    transforming the initial positions of the geometry details in the local coordinate systems into a shared coordinate system;
    executing a relative movement between the measuring heads and the vehicle while keeping the relative positions of the measuring heads with respect to one another constant;
    detecting again the two geometry details of the vehicle using the two measuring heads;
    for each detected geometry detail, determining a final position of the geometry detail in the local coordinate system associated with the respective measuring head;
    transforming the final positions of the geometry details in the local coordinate systems into the shared coordinate system;
    determining, for each measuring head, a respective movement vector based on a difference between the final position and the initial position of the respective geometry detail in the shared coordinate system; and
    checking the movement vector for the first measuring head for coincidence with the movement vector for the second measuring head.

2. The method as recited in claim 1, wherein the relative movement between the measuring heads and the vehicle includes at least two translations which are not parallel to one another.

3. The method as recited in claim 1, wherein the geometry detail detected by the first measuring head is situated on a first side of the vehicle and the geometry detail detected by the second measuring head is situated on a side of the vehicle diametrically opposite to the first side.

4. The method as recited in claim 1, wherein the relative movement between the measuring heads and the vehicle is achieved by moving the vehicle in relation to the measuring heads.

5. The method as recited in claim 1, wherein the relative movement between the measuring heads and the vehicle is achieved by moving the measuring heads in relation to the vehicle.

6. The method as recited in claim 1, further comprising:
    adjusting the measuring heads based on the result of the checking of the movement vectors for the first and second measuring heads.

7. The method as recited in claim 6, wherein, during the step of adjustment of the measuring heads, the movement vectors determined by the measuring heads are made to coincide.

8. The method as recited in claim 7, wherein the adjustment includes adaptation of parameters for transforming the positions of the geometry details from the local coordinate systems into the shared coordinate system.

9. A method for checking the referencing of at least two measuring heads of a contactless vehicle-chassis measuring system, comprising:
    detecting two geometry details of a vehicle using the measuring heads;
    for each detected geometry detail, determining an initial position of the geometry detail in a local coordinate system associated with the respective measuring head;
    executing a relative movement between the measuring heads and the vehicle while keeping the relative positions of the measuring heads with respect to one another constant;
    detecting again the two geometry detail of the vehicle using the two measuring heads;
    for each detected geometry detail, determining a final position of the geometry detail in the local coordinate system associated with the respective measuring head;
    determining, for each measuring head, a respective movement vector based on a difference between the final position and the initial position of the respective geometry detail in the respective local coordinate system;
    transforming the movement vectors for the two measuring heads into a shared coordinate system; and
    checking the movement vector for the first measuring head for coincidence with the movement vector for the second measuring head in the shared coordinate system.

10. The method as recited in claim 9, wherein the relative movement between the measuring heads and the vehicle includes at least two translations which are not parallel to one another.

11. The method as recited in claim 9, wherein the geometry detail detected by the first measuring head is situated on a first side of the vehicle and the geometry detail detected by the second measuring head is situated on a side of the vehicle diametrically opposite to the first side.

12. The method as recited in claim 9, further comprising:
    adjusting the measuring heads based on the result of the checking of the movement vectors for the first and second measuring heads.

13. The method as recited in claim 12, wherein, during the step of adjustment of the measuring heads, the movement vectors determined by the measuring heads are made to coincide.

14. The method as recited in claim 13, wherein the adjustment includes adaptation of parameters for transforming the movement vectors for the two measuring heads into the shared coordinate system.

15. A device for measuring the chassis geometry of a vehicle, comprising:
    at least two measuring heads configured to detect two respective geometry details of the vehicle and, for each geometry detail, determine an initial position and a final position in a local coordinate system associated with the respective measuring head, wherein the final position is achieved by relative movement between the vehicle and the respective measuring head; and
    an analysis unit configured to:
        transform the initial positions and the final positions of the geometry details in the local coordinate systems into a shared coordinate system;
        determine, for each measuring head, a respective movement vector based on a difference between the final position and the initial position of the respective geometry detail in the shared coordinate system; and check the movement vector for the first measuring head for coincidence with the movement vector for the second measuring head.

16. The device as recited in claim 15, wherein at least one of the measuring heads has a camera.

17. The device as recited in claim 15, further comprising:
a movement mechanism configured to implement movement of the measuring heads relative to the vehicle while keeping the relative positions of the measuring heads with respect to one another constant.

18. A device for measuring the chassis geometry of a vehicle, comprising:
at least two measuring heads configured to detect two respective geometry details of the vehicle and, for each geometry detail, determine an initial position and a final position in a local coordinate system associated with the respective measuring head, wherein the final position is achieved by relative movement between the vehicle and the respective measuring head; and
an analysis unit configured to:
determine, for each measuring head, a respective movement vector based on a difference between the final position and the initial position of the respective geometry detail in the respective local coordinate system;
transform the movement vectors for the two measuring heads into a shared coordinate system; and
check the movement vector for the first measuring head for coincidence with the movement vector for the second measuring head in the shared coordinate system.

19. The device as recited in claim 18, wherein at least one of the measuring heads has a camera.

20. The device as recited in claim 18, further comprising:
a movement mechanism configured to implement movement of the measuring heads relative to the vehicle while keeping the relative positions of the measuring heads with respect to one another constant.

* * * * *